(12) United States Patent
Yu et al.

(10) Patent No.: US 9,400,924 B2
(45) Date of Patent: Jul. 26, 2016

(54) OBJECT RECOGNITION METHOD AND OBJECT RECOGNITION APPARATUS USING THE SAME

(71) Applicant: INDUSTRIAL TECHNOLOGY RESEARCH INSTITUTE, Hsinchu (TW)

(72) Inventors: Chih-Hsiang Yu, Zhubei (TW); Shys-Fan Yang Mao, Zhubei (TW); Wen-Wei Peng, Keelung (TW); Tzuan-Ren Jeng, Hsinchu (TW); Hsien-Chang Lin, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 30 days.

(21) Appl. No.: 14/569,198

(22) Filed: Dec. 12, 2014

(65) Prior Publication Data

US 2015/0339520 A1  Nov. 26, 2015

Related U.S. Application Data

(60) Provisional application No. 62/002,498, filed on May 23, 2014.

(51) Int. Cl.
*G06K 9/00* (2006.01)
*G06K 9/62* (2006.01)

(52) U.S. Cl.
CPC .............. *G06K 9/00355* (2013.01); *G06K 9/00* (2013.01); *G06K 9/62* (2013.01); *G06K 9/6215* (2013.01)

(58) Field of Classification Search
None
See application file for complete search history.

(56) References Cited

U.S. PATENT DOCUMENTS 7,308,112 B2 * 12/2007 Fujimura ........... G06K 9/00355
382/103
8,306,314 B2  11/2012 Tuzel et al.
(Continued)

FOREIGN PATENT DOCUMENTS

| CN | 101332362 B | 9/2012 |
|---|---|---|
| CN | 103559489 A | 2/2014 |

(Continued)

OTHER PUBLICATIONS

S. Malassiotis et al., A Gesture Recognition System Using 3D Data, Proceeding of the First International Symposium on 3D Data Processing Visualization and Transmission, IEEE Computer Society, 2002, 1-4.
(Continued)

*Primary Examiner* — Nancy Bitar
(74) *Attorney, Agent, or Firm* — Locke Lord LLP; Tim Tingkang Xia, Esq.

(57) ABSTRACT

An object recognition method and an object recognition apparatus using the same are provided. In one or more embodiments, a real-time image including a first object is acquired, and a chamfer distance transform is performed on the first object of the real-time image to produce a chamfer image including a first modified object. Preset image templates each including a second object are acquired, and the chamfer distance transform is performed on the second object of each preset image template to produce a chamfer template including a second modified object. When the difference between the first modified object and the second modified object is less than a first preset error threshold, the object recognition apparatus may operate according to a control command corresponding to the preset image template.

30 Claims, 14 Drawing Sheets

(56) References Cited

U.S. PATENT DOCUMENTS

| | | | |
|---|---|---|---|
| 8,570,383 B2 | 10/2013 | Klefenz et al. | |
| 8,625,897 B2* | 1/2014 | Criminisi | G06K 9/38 382/173 |
| 8,755,568 B2 | 6/2014 | Adhikari | |
| 2008/0212836 A1 | 9/2008 | Fujimura et al. | |
| 2009/0110292 A1* | 4/2009 | Fujimura | G06F 3/017 382/203 |
| 2013/0279756 A1 | 10/2013 | Menadeva et al. | |
| 2013/0335324 A1 | 12/2013 | Kaplan et al. | |
| 2014/0028539 A1 | 1/2014 | Newham et al. | |
| 2014/0055343 A1 | 2/2014 | Kim | |
| 2015/0193923 A1* | 7/2015 | Soto | G06T 7/004 382/106 |

FOREIGN PATENT DOCUMENTS

| | | |
|---|---|---|
| CN | 103649967 A | 3/2014 |
| TW | 200725380 | 7/2007 |
| TW | 201228357 A | 7/2012 |
| TW | I394087 B | 4/2013 |
| TW | I395145 B | 5/2013 |

OTHER PUBLICATIONS

C. Wayn Niblack, Generating skeletons and centerlines from the distance transform, CVGIP: Graphical Models and Image Processing, 1992, Abstract only.

Ismail Haritaoglu et al., Ghost: A Human Body Part Labeling System Using Silhouettes, International Conference on Pattern Recognition—ICPR, 1998.

Xia Liu et al., Hand Gesture Recognition using Depth Data, Proceedings of the Sixth IEEE International Conference on Automatic Face and Gesture Recognition, IEEE Computer Society, 2004.

Zhou Ren et al., Robust hand gesture recognition based on finger-earth mover's distance with a commodity depth camera, In Proceedings of ACM Multimedia, 2011, 1093-1096.

Intellectual Property Office, Ministry of Economic Affairs, R. O. C, "Notice of Allowance", Sep. 23, 2015, Taiwan.

* cited by examiner

OBJECT RECOGNITION METHOD AND OBJECT RECOGNITION APPARATUS USING THE SAME

CROSS-REFERENCE TO RELATED APPLICATIONS

This non-provisional application claims priority under 35 U.S.C. §119(a) on Patent Application No. 62/002,498 filed in United States on May 23, 2014, the entire contents of which are hereby incorporated by reference.

TECHNICAL FIELD

The disclosure relates to an object recognition method and an object recognition apparatus using the same.

BACKGROUND

Supporting object recognition has become one of basic features in the operation interface of smart glasses. However, the portable device, e.g. the smart glasses, supporting the gesture recognition faces some problems. To accurately recognize individual data with three dimensions (e.g. translation (shifting), scaling, and rotation) may involve a great deal of data to be processed and spend a lot of time. When the gesture recognition is applied in the image capturing or the video recording, the user's hand may be captured easily and presented in images captured by a user. Since each one has his hand gestures, the user may not be satisfied with only one common gesture setting.

SUMMARY

According to one or more embodiments, the disclosure provides an object recognition method applied to an object recognition apparatus. In one embodiment, the object recognition method includes the following steps. The object recognition apparatus acquires a real-time image comprising a first object and then performs a chamfer distance transform on the first object of the real-time image to produce a chamfer image comprising a first modified object. Also, the object recognition apparatus acquires a plurality of preset image templates comprising a second object and then performs the chamfer distance transform on the second object of each of the plurality of preset image templates to produce a chamfer template comprising a second modified object. The object recognition apparatus determines whether difference between the first modified object and one of the second modified objects is less than a first preset error threshold. When the difference between the first modified object and the second modified object is less than the first preset error threshold, the object recognition apparatus looks up a control command according to the preset image template corresponding to the second modified object. The object recognition apparatus is controlled by the control command.

According to one or more embodiments, the disclosure provides, the disclosure provides an object recognition apparatus. The object recognition apparatus includes a first image capturing device, a storage device, and a processing device. The first image capturing device records a real-time image comprising a first object. The storage device stores preset image templates, and each of the preset image templates comprises a second object. The processing device is connected to the first image capturing device and the storage device. The processing device receives the real-time image from the first image capturing device and performs a chamfer distance transform on the first object of the real-time image to produce a chamfer image comprising a first modified object. The processing device receives the preset image templates from the storage device and respectively performing the chamfer distance transform on the second objects of the preset image templates to produce chamfer templates. Each of the chamfer templates includes a second modified object. The processing device determines whether difference between the first modified object and one of the second modified objects is less than a first preset error threshold. When the difference between the first modified object and the second modified object is less than the first preset error threshold, the processing device looks up a control command according to the preset image template corresponding to the second modified object. The object recognition apparatus operates according to the control command.

According to one or more embodiments, the disclosure provides an object recognition method applied to an object recognition apparatus. In one embodiment, the object recognition method includes the following steps. The object recognition apparatus acquires an original frame from a first image capturing device and performs an image pre-processing procedure on the original frame to produce a real-time image comprising a first object. The object recognition apparatus performs a chamfer distance transform on the first object of the real-time image to generate a chamfer image comprising a first modified object. The object recognition apparatus acquires a plurality of preset image templates comprising a second object and performs the chamfer distance transform on the second object of each of the plurality of preset image templates to generate a chamfer template comprising a second modified object. The object recognition apparatus determines whether difference between the first modified object and one of the second modified objects is less than a first preset error threshold. When the difference between the first modified object and one of the second modified objects is less than the first preset error threshold, the object recognition apparatus looks up a control command according to the preset image template corresponding to the second modified object. The object recognition apparatus is controlled by the control command.

According to one or more embodiments, the disclosure provides an object recognition method applied to an object recognition apparatus. In one embodiment, the object recognition method includes the following steps. The object recognition apparatus acquires a real-time image, which comprises a first object, from a first image capturing device and performs a chamfer distance transform on the first object of the real-time image to produce a chamfer image comprising a first modified object. The object recognition apparatus acquires preset image templates each comprising a second object and performs the chamfer distance transform on the second object of each of the preset image templates to produce a chamfer template comprising a second modified object. The object recognition apparatus determines whether difference between the first modified object and each of the second modified objects is less than a preset error threshold. When the difference between the first modified object and one of the second modified objects is less than the preset error threshold, the object recognition apparatus looks up a control command according to the preset image template corresponding to the second modified object. When movement of the first object in a sequence of next real-time images acquired from the first image capturing device matches a preset trace model, the object recognition apparatus operates according to the control command.

BRIEF DESCRIPTION OF THE DRAWING

The present disclosure will become more fully understood from the detailed description given herein below and the accompanying drawings which are given by way of illustration only and thus are not limitative of the present disclosure, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings. It should be appreciated that the embodiments described herein are used for describing and explaining the present disclosure but not for limiting the disclosure.

The disclosure in various embodiments provides an object recognition method and an object recognition apparatus using the same. In one embodiment, the disclosure can be applied to an electric device, such as a smart glasses, which is capable of supporting object recognition, for example, hand gesture recognition. Therefore, the electric device can detect a static or moving object (e.g. a user's hand) and recognize the shape and/or gestures (or movement) of the object by a two-dimensional chamfer distance transformation (hereinafter referred as to 2D chamfer DT) to obtain a recognition result. As a result, the recognition result can be applied to any possible control (activate corresponding applications) such as the unlocking of locked screens, the scaling of pictures displayed on screen, the selection of icons or objects displayed on screen, or the image capturing. The one or more embodiments of the object recognition method and the object recognition apparatus are described below. In order to clearly describe the disclosure, the hand gesture recognition is taken as an example in the following embodiments.

Figure 1:
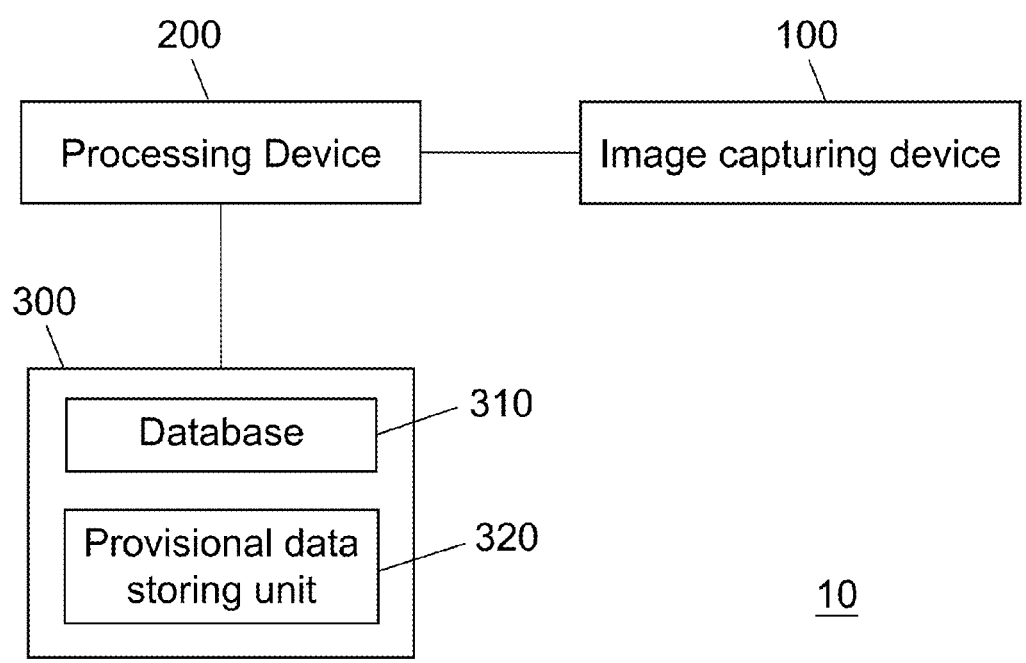
FIG. 1 is a block diagram of an object recognition apparatus according to an embodiment in the disclosure.

Please refer to FIG. 1. FIG. 1 illustrates a block diagram of an object recognition apparatus according to an embodiment in the disclosure. The object recognition apparatus 10 includes an image capturing device 100, a processing device 200, and a storage device 300. The processing device 200 is coupled to the image capturing device 100 and the storage device 300.

Figure 2A:
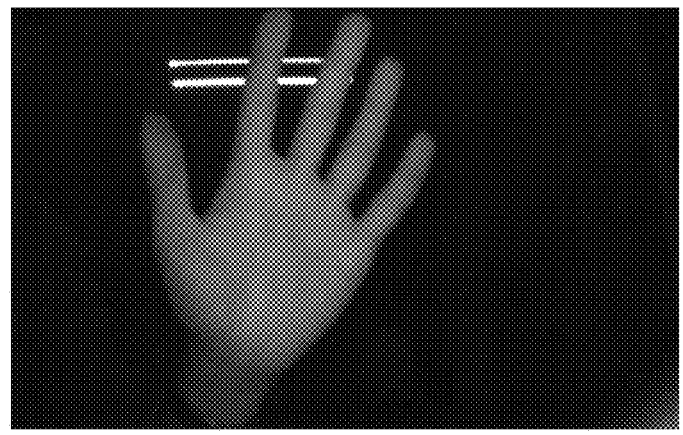
FIG. 2A is a schematic view of a first frame according to an embodiment in the disclosure.
Figure 2B:
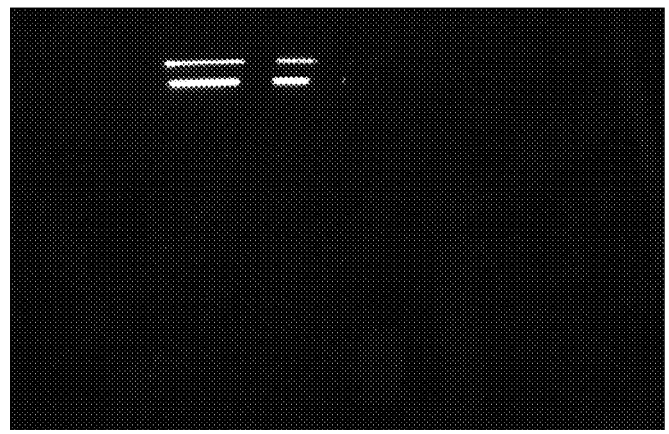
FIG. 2B is a schematic view of a second frame according to an embodiment in the disclosure.
Figure 3A:
FIG. 3A is a schematic view of a color frame according to an embodiment in the disclosure.
Figure 3B:
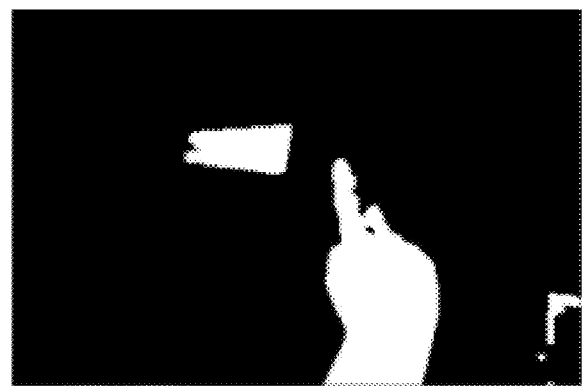
FIG. 3B is a schematic view of a real-time image related to the color frame in FIG. 3A.
Figure 3C:
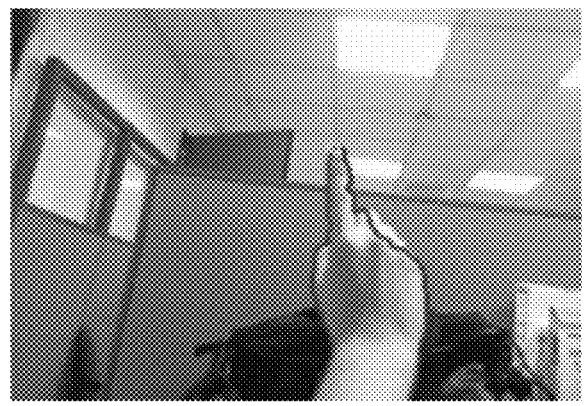
FIG. 3C is a schematic view of a color frame according to another embodiment in the disclosure.

The image capturing device 100 may continuously or discontinuously capture the ambient environment where a user's hand exists, in original frames. In one embodiment, the image capturing device 100 may be an infrared (IR) camera (or called thermo graphic camera or thermal imaging camera), a color camera, or a depth camera. In one exemplary embodiment, the IR camera in its shutter period captures the ambient environment to output a first frame (as shown in FIG. 2A) when cooperating with the IR light source, and also captures the ambient environment to output a second frame (as shown in FIG. 2B) when not cooperating with the IR light source. The background of the first frame is, for example, the same as that of the second frame. In other exemplary embodiment, the color camera may capture the ambient environment to output color frames (as shown in FIG. 3A or FIG. 3C). In other exemplary embodiment, the depth camera may capture the ambient environment to produce original frames under 2D depth maps.

The processing device 200 receives each original frame from the image capturing device 100, preprocesses the received original frame in an image pre-processing procedure to produce a real-time image to be recognized (that is called real-time image hereinafter), and reads out one or more preset image templates from the storage device 300 to perform a object recognition on the real-time image and the one or more read-out preset image templates to obtain a recognition result. Then, the processing device 200 may perform a control operation according to the recognition result.

The storage device 300 may include a database 310 for storing multiple preset image templates. These preset image templates respectively correspond to control commands to control the object recognition apparatus 10 to unlock the locked screen, scale pictures displayed on screen, select icons or objects displayed on screen, perform image capturing, or the like. In this or some embodiments, the storage device 300 may further include a provisional data storing unit 320 for storing one or more provisional reference images.

In the image pre-processing procedure, the processing device 200 may remove the background within the original frame. To clearly illustrate the image pre-processing procedure, various exemplary embodiments based on the IR camera, the color camera, and the depth camera are taken as follows.

Figure 2C:
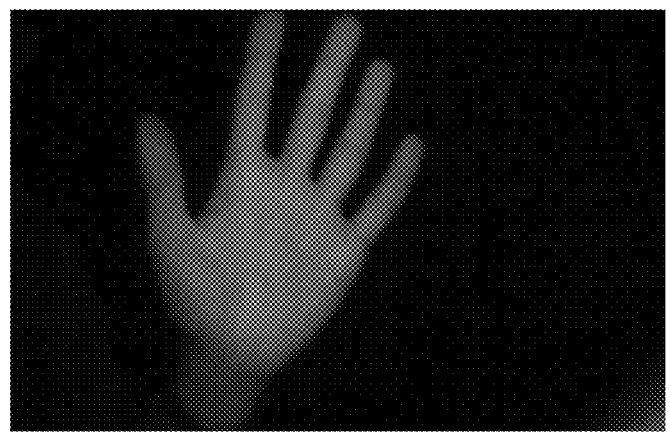
FIG. 2C is a schematic view of a real-time image according to an embodiment in the disclosure.

In the case of the IR camera, the processing device 200 compares the first frame (as shown in FIG. 2A) with the second frame (as shown in FIG. 2B) to remove the background within the first frame and remain the image content within a maximum region (or called handed region or first object) where the brightness of each pixel is higher than a brightness threshold, to produce the real-time image (as shown in FIG. 2C) presenting the user's hand. That is, the first frame is set as the real-time image after the first frame except the first object is filtered off. The first object of the first frame is the user's hand.

Figure 3D:
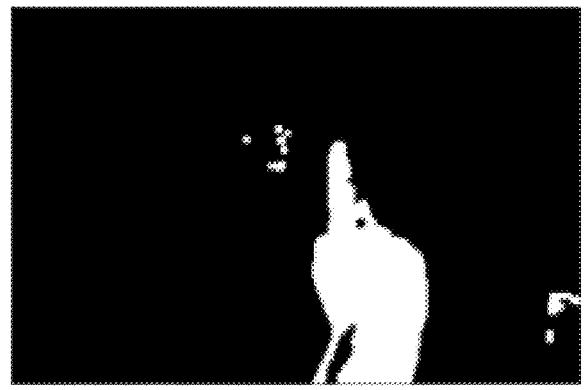
FIG. 3D is a schematic view of a real-time image related to the color frame in FIG. 3C.

In the case of the color camera, the processing device 200 nonlinearly transforms the color space of the color frame to make the skin-color cluster luma-independent, and selects a skin-color model (or called a preset color model). The processing device 200 employs the transformation result and the skin-color model to remove the background within the color frame (as shown in FIG. 3A or FIG. 3C) to produce the real-time image (as shown in FIG. 3B or FIG. 3D) presenting the user's hand. Specifically, the processing device 200 can select a maximum region of the transformed original frame which matches the preset color model, and then set the maximum region of the transformed original frame as the first object. The processing device 200 sets the transformed original frame as the real-time image after filtering off the transformed color frame except the first object. Moreover, in this or some embodiments, the processing device 200 can further perform a dynamic self-training procedure to analyze the color gamut of the color frame (as shown in FIG. 3B) and limit the current skin-color cluster according to the Gaussian distribution such that the real-time image (as shown in FIG. 3D) may only present the user's hand.

Figure 4:
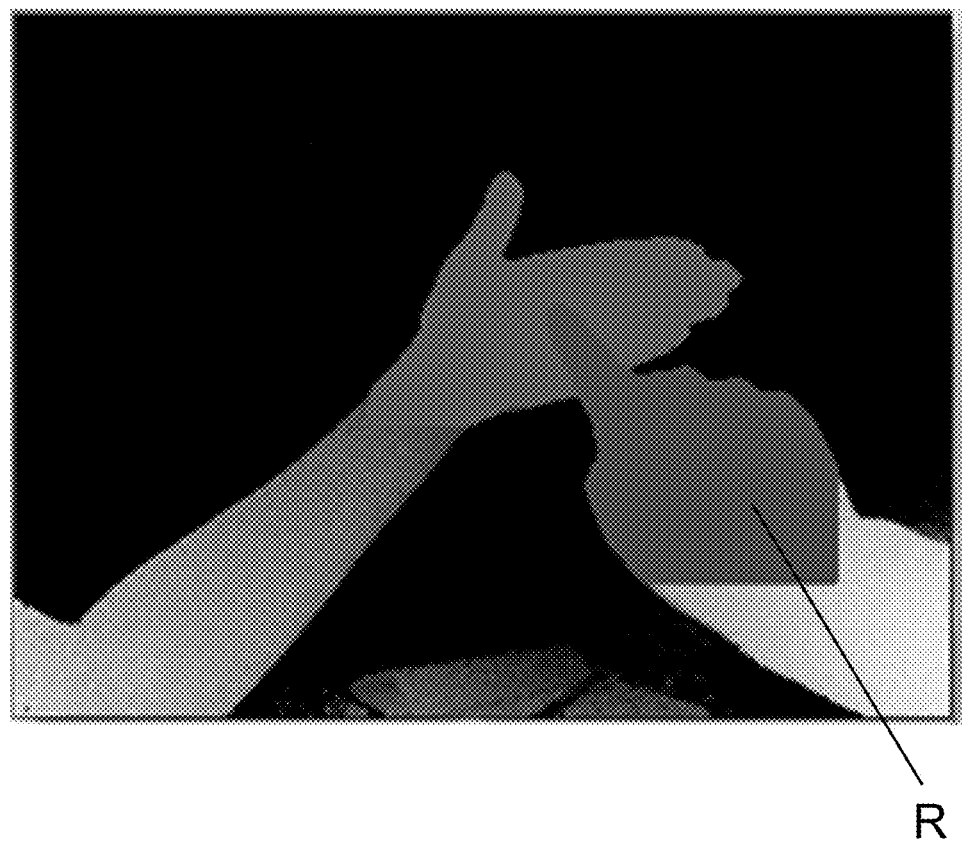
FIG. 4 is a schematic view of an image frame with depth information according to an embodiment of the disclosure.

In the case of the depth camera, the processing device 200 segments the original frame into candidate blocks according to the 2D depth maps and selects one of the candidate blocks as the first object. The selected candidate block has an area (i.e. the two dimension (2D) size) larger than or equal to an area threshold and is the nearest to the depth camera. The processing device 200 sets the original frame as the real-time image after the original frame except the first object is filtered off. Please refer to the following FIG. 4 which is a schematic view of an image frame with depth information according to an embodiment of the disclosure. As shown in the figure, the right hand R is recognized as the proximal object (i.e. the first object) and the contour of the right hand R is obtained by the depth information.

In other embodiment, the image capturing device 100 can further perform the image pre-processing procedure on the original frame to directly output the real-time image such that the processing device 200 can obtain the real-time image from the image capturing device 100 and then perform the chamfer distance transform on the real-time image without performing the image pre-processing procedure.

The processing device 200 in this or some embodiments can further performs the translation (shifting), scaling, and/or rotation procedures on the preset image template and/or the chamfer template such that the processing device 200 can easily perform object recognition. The translation (shifting), scaling, and rotation procedures will be illustrated later.

Figure 7A:
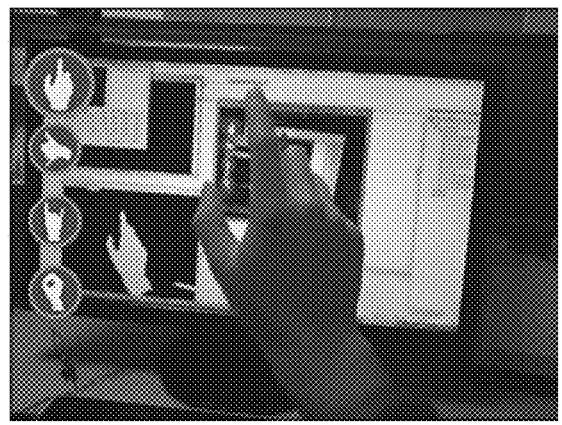
FIG. 7A is a schematic view of an original frame according to an embodiment in the disclosure.
Figure 7B:
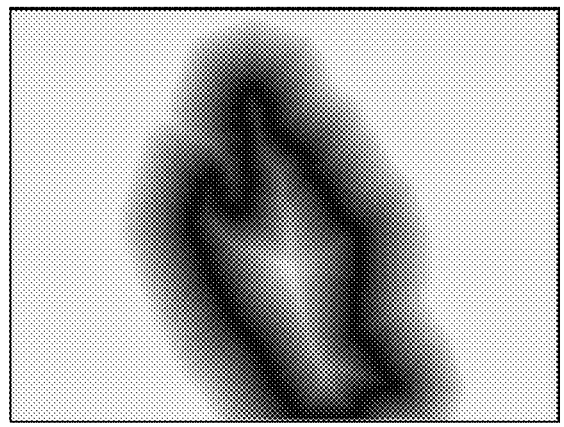
FIG. 7B is a schematic view of a chamfer image related to the original frame in FIG. 7A.
Figure 7C:
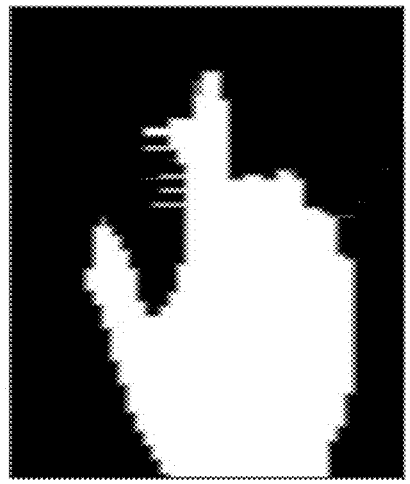
FIG. 7C is a schematic view of a preset image template according to an embodiment in the disclosure.
Figure 7D:
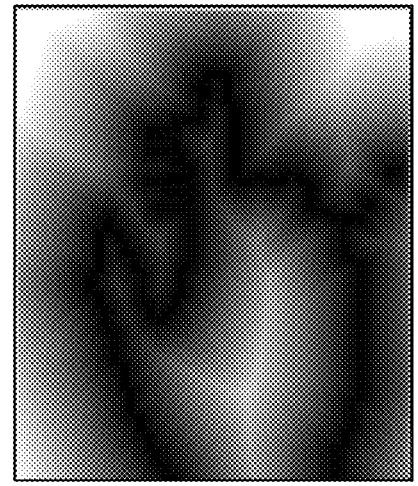
FIG. 7D is a schematic view of a chamfer template related to the preset image template in FIG. 7C.

In one embodiment, the processing device 200 may check whether the received real-time image matches one of the preset image templates. The processing device 200 performs a chamfer distance transform on the first object in the real-time image (as shown in FIG. 7A) to produce a chamfer image (as shown in FIG. 7B), and also performs the chamfer distance transform on a second object in each preset image template (as shown in FIG. 7C) to produce a chamfer template (as shown in FIG. 7D). For example, the chamfer distance transform is performed on edges or skeletons of the first object and the second object. The chamfer image includes a first modified object generated from the first object. Each chamfer template includes a second modified object generated from the second object. The processing device 200 compares the first modified object of the chamfer image with the second modified object of each chamfer template. When the first modified object of the chamfer image does not match the second modified object of any one of the chamfer templates, the processing device 200 will not output any control command. When the first modified object of the chamfer image matches the second modified object of one of the chamfer templates, the processing device 200 will look up a control command corresponding to the matched preset image template. Therefore, the electric device can operate according to the control command. For example, whether the first modified object of the chamfer image matches the second modified object of one chamfer template can be determined according to their pixels.

In one embodiment, when the difference between the first modified object of the chamfer image and the second modified object of the chamfer template is less than a first preset error threshold, the chamfer image will be considered as matching the chamfer template, that is, the real-time image matches the preset image template. Otherwise, the chamfer image will be considered as not matching the chamfer template, that is, the real-time image does not match such a preset image template. The first preset error threshold is, for example, a peak signal-to-noise ratio (PSNR) or a mean squared error (MSE) value.

In this or some embodiments, the processing device 200 may further perform a dynamic template training procedure (or called gesture template training procedure). In the dynamic template training procedure, before determining whether the real-time image matches any one of the preset image templates, the processing device 200 can further check whether the real-time image matches a previous recognized image (or called a current provisional reference image). The previous recognized image may be a previous real-time image that is checked and matches its corresponding preset image template. When the real-time image matches the previous recognized image and the preset image template, the real-time image may be set as a new provisional reference image to a next recognition task. The new provisional reference image may replace the current provisional reference image.

In one embodiment, determining whether the real-time image matches the previous recognized image is similar to determining whether the real-time image matches the preset image template. The processing device 200 performs the chamfer distance transform on a third object of the previous recognized image to produce a chamfer reference image. For example, the chamfer distance transform is performed on edges or skeletons of the third object. The chamfer reference image includes a third modified object generated from the third object. The processing device 200 determines whether the difference between the first modified object of the chamfer image and the third modified object of the chamfer reference image is less than a second preset error threshold. If yes, the chamfer image will be considered as matching the chamfer reference template, that is, the real-time image matches the previous recognized image. If not, the chamfer image will be considered as not matching the chamfer reference template, that is, the real-time image does not match the previous recognized image. The second preset error threshold is, for example, a peak signal-to-noise ratio (PSNR) value or a mean squared error (MSE) value.

In addition, the previous recognized image can be adjusted by the above translation (shifting), scaling, and/or rotation procedures, whereby the comparison between the real-time image and the previous recognized image may be speeded up.

The processing device 200 may recognize not only static objects but also moving objects. When recognizing a sequence of real-time images sequentially and sensing that the movement of the first object in these real-time images matches a preset trace model, the processing device 200 outputs the control command corresponding to the preset trace model. For example, the processing device 200 first selects one control command corresponding to the first object of the first one of the real-time images. When the movement of the first object in the real-time images matches the preset trace model, the processing devices outputs the control command.

In view of the aforementioned embodiments, the operation of the above object recognition apparatus 10 in FIG. 1 may be summarized in the object recognition method described in the following one or more embodiments.

Figure 5:
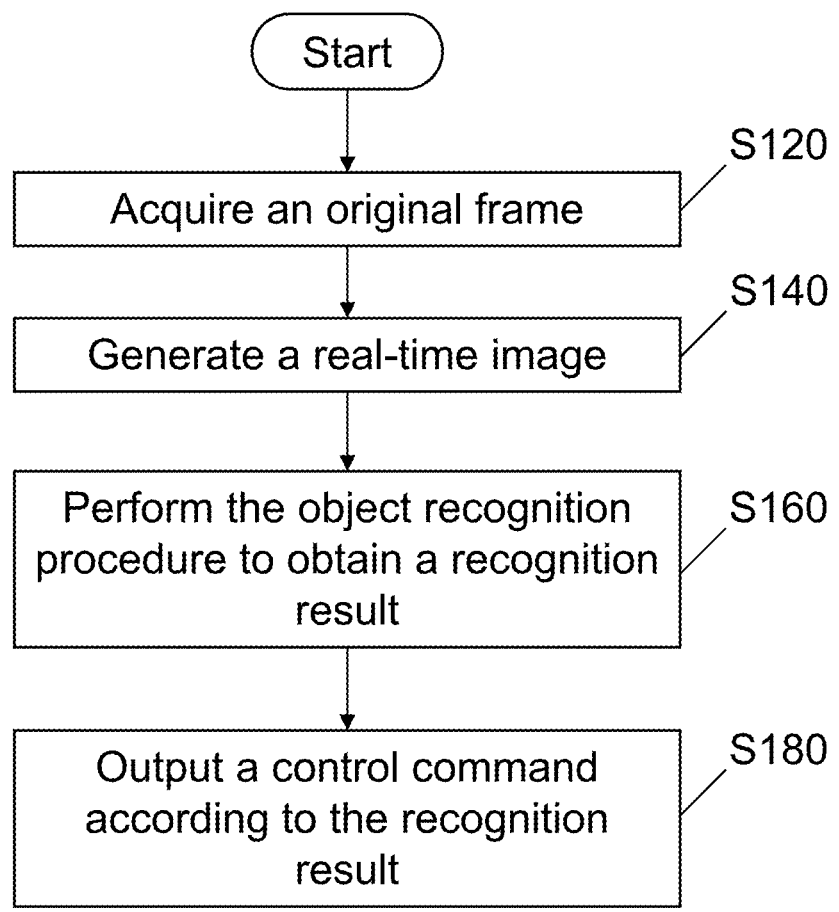
FIG. 5 is a flow chart of an object recognition method according to an embodiment of the disclosure.

Referring to FIG. 5, a flow chart of an object recognition method is illustrated according to an embodiment. The processing device 200 acquires an original frame from the image capture device 100 (step S120). The processing device 200 performs the aforementioned image pre-processing procedure to remove the background within the original frame to produce a real-time image (step S140) and performs the object recognition procedure to check whether the real-time image matches one of preset image templates stored in the storage device 300, to obtain a recognition result (step S160). The processing device 200 outputs a control command according to the recognition result (step S180). The acquiring of the original frame and the image pre-processing procedure can be referred the above description related to FIG. 1, and they will not repeated hereinafter. The various embodiments of the object recognition procedure may be illustrated by referring to FIG. 6 and FIG. 8.

Figure 6:
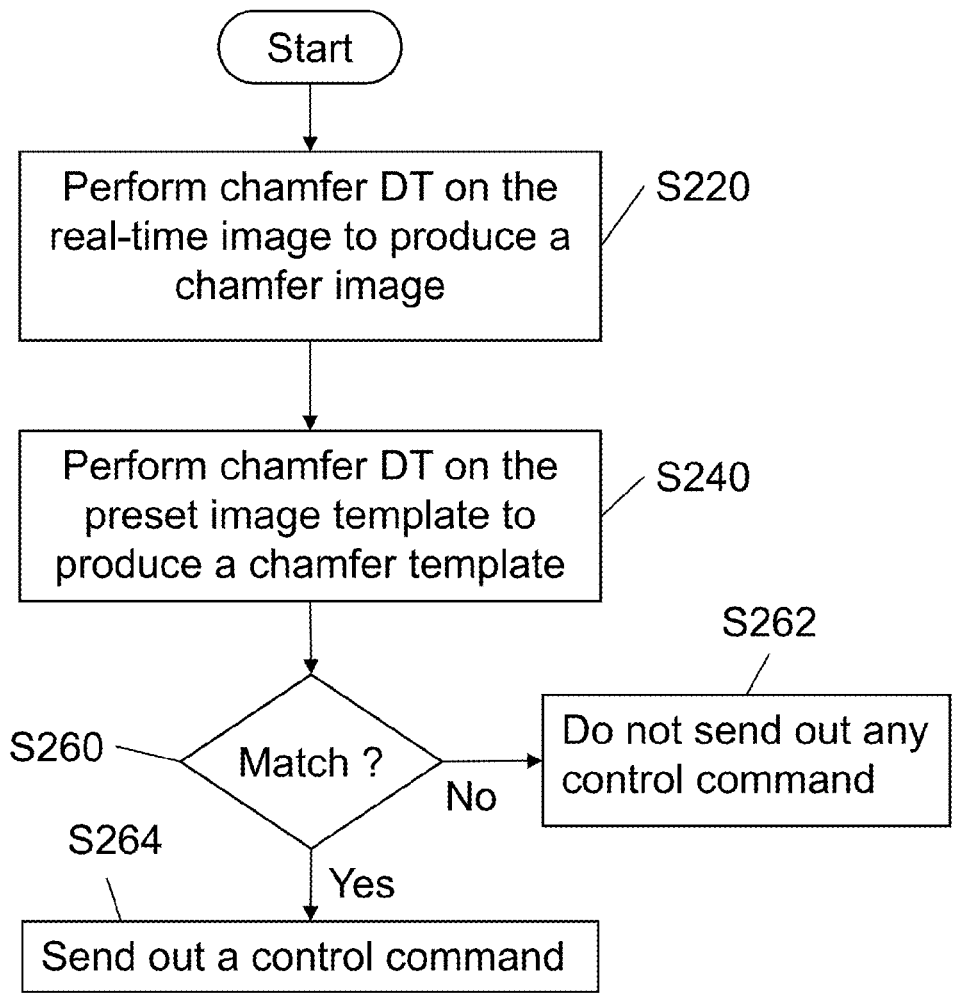
FIG. 6 is a flow chart of an object recognition method according to another embodiment of the disclosure.

FIG. 6 is a flow chart of the object recognition procedure according to an exemplary embodiment of the disclosure. The processing device 200 detects the edge of the user's hand presented in the real-time image related to the original frame (as shown in FIG. 7A) and performs the aforementioned chamfer distance transform on a first object of the real-time image to produce a chamfer image (as shown in FIG. 7B) (step S220). Also the processing device 200 detects the edge of a hand presented in the preset image template (as shown in FIG. 7C) and performs the aforementioned chamfer distance transform on a second object of each of the preset image templates to produce a chamfer template (as shown in FIG. 7D) (step S240). The processing device 200 checks whether the chamfer image matches one of the chamfer templates (step S260), that is, to check whether the difference between the chamfer image and the chamfer template is less than a first preset error threshold such as a PSTNR value or a MSE value. If not, the real-time image will be determined as an invalid image. Herein, the processing device 200 may not send out any control command (step S262). Otherwise, if yes, the real-time image will be determined as a valid image and the processing device 200 will send out a control command corresponding to the matched preset image template (step S264).

Figure 8:
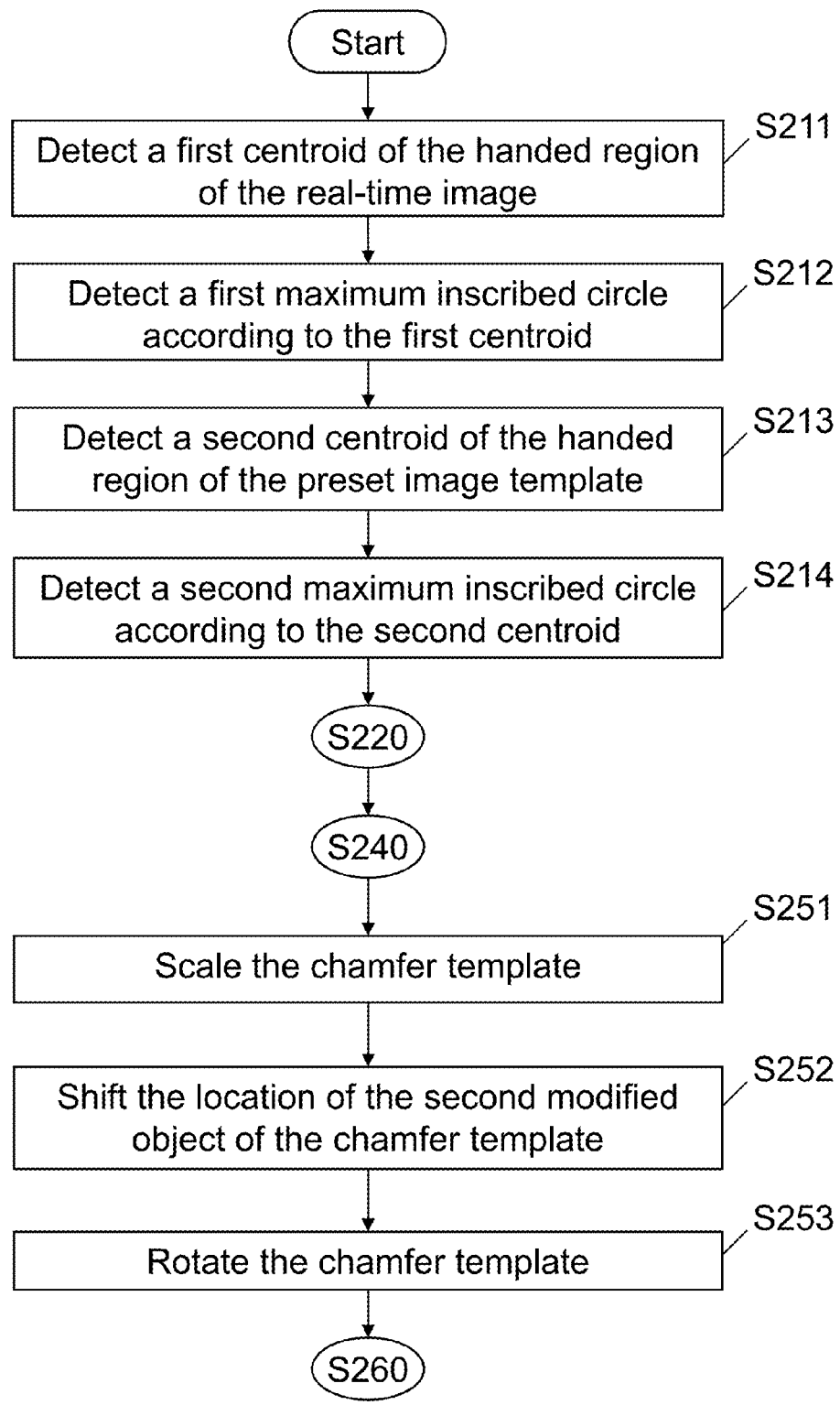
FIG. 8 is a flow chart of an object recognition procedure according to another embodiment of the disclosure.
Figure 9A:
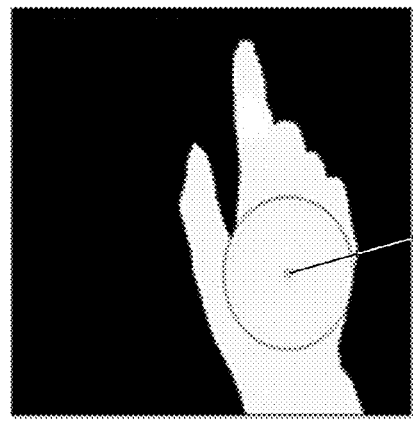
FIG. 9A is a schematic view of a real-time image with a larger handed region according to an embodiment of the disclosure.
Figure 9B:
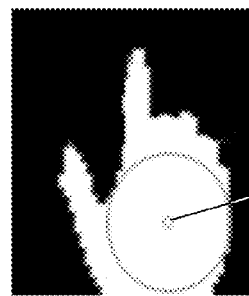
FIG. 9B is a schematic view of a preset image template related to the real-time image in FIG. 9A.
Figure 9C:
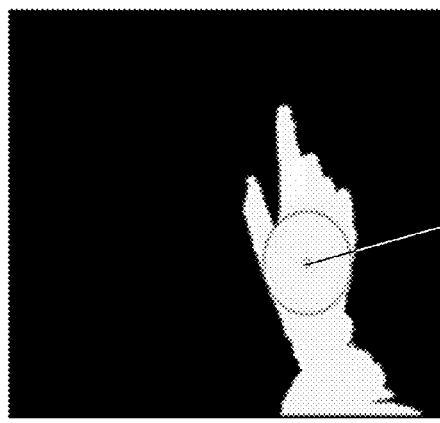
FIG. 9C is a schematic view of a real-time image with a smaller handed region according to an embodiment of the disclosure.
Figure 9D:
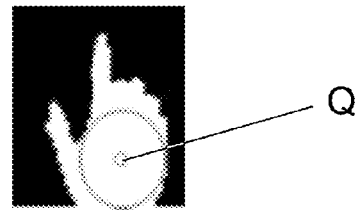
FIG. 9D is a schematic view of a preset image template related to the real-time image in FIG. 9C.

FIG. 8 is a flow chart of the object recognition method according to another embodiment of the disclosure. Before a chamfer image and a chamfer template are produced (steps S220 and S240), the processing device 200 can further adjust the preset image template. The processing device 200 detects a first centroid P of the first object (i.e. the handed region) of the real-time image as shown in FIG. 9A or FIG. 9C (step S211) and detects a first maximum inscribed circle (MIC) in the first object of the real-time image according to the first centroid P (step S212). Also, the processing device 200 detects a second centroid Q of the second object (i.e. the handed region) of the preset image template as shown in FIG. 9B or FIG. 9D (step S213) and detects a second maximum inscribed circle in the second object of the preset image template according to the second centroid Q (step S214). The larger the first maximum inscribed circle is, the larger the preset image template is. In this way, the location, area, shape and size of the first object of the real-time image and the location, area, shape and size of the second object of the preset image template can be known.

Figure 10A:
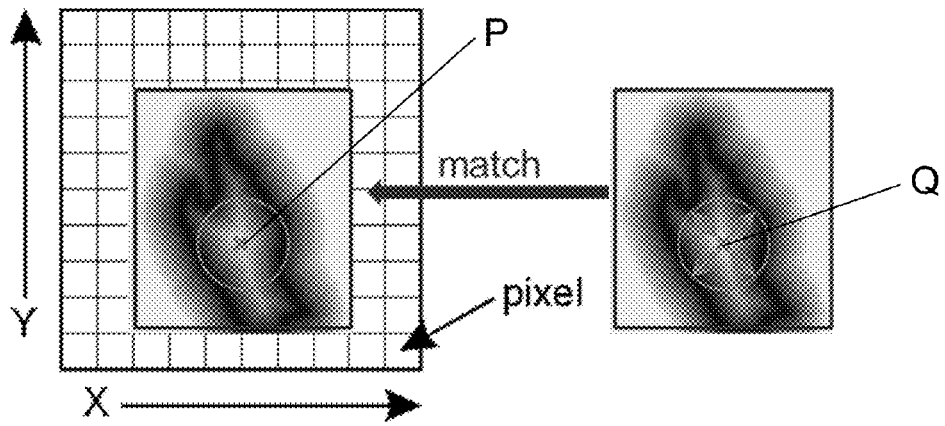
FIG. 10A is a schematic view of scaling the chamfer template according to an embodiment of the disclosure.
Figure 10B:
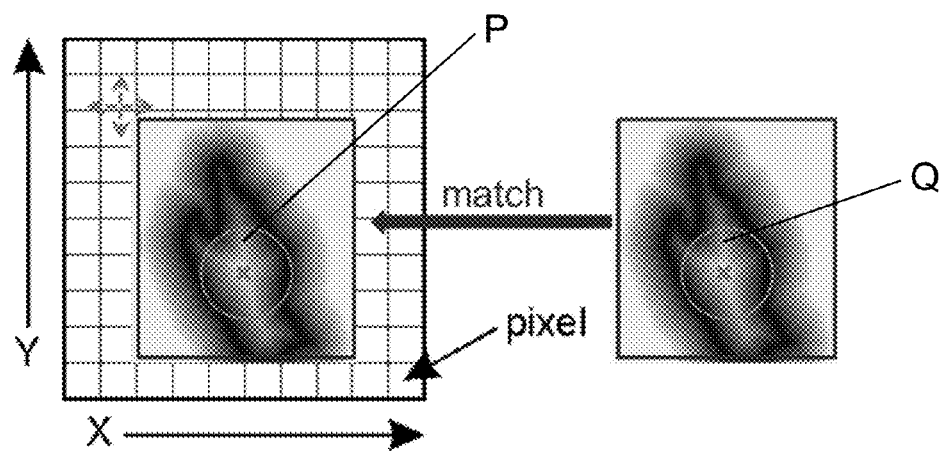
FIG. 10B is a schematic view of shifting the chamfer template according to an embodiment of the disclosure.
Figure 10C:
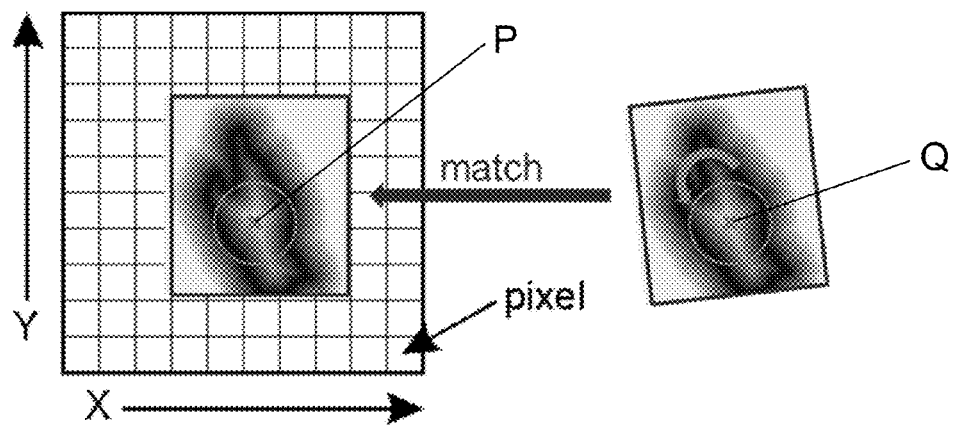
FIG. 10C is a schematic view of rotating the chamfer template according to an embodiment of the disclosure.

When a chamfer image and a chamfer template are produced (steps S220 and S240), the processing device 200 can further lap the chamfer image over the chamfer template to scale the chamfer template as shown in FIG. 10A (step S251), shift (translate) the chamfer template as shown in FIG. 10B (step S252), and/or rotate the chamfer template as shown in FIG. 10C (step 253) according to the first centroid P, the second centroid Q, and the first and second maximum inscribed circles. For example, the scaling, shifting, and rotating an object in an image can be based on pixels of the image as shown in FIGS. 10A to 10C.

In one exemplary embodiment of the step S251, the processing device 200 may scale up or down the chamfer template by a scale factor which is obtained by calculating a ratio of a first area of the first modified object of the chamfer image to a second area of the second modified object of the chamfer template, by calculating a ratio of a third area of the first maximum inscribed circle to a fourth area of the second maximum inscribed circle, or by calculating a ratio of the diameter (or the radius) of the first maximum inscribed circle to the diameter (or the radius) of the second maximum inscribed circle.

In an exemplary embodiment of the step S252, the processing device 200 shifts the location of the second modified object of the chamfer template by comparing the location of the first centroid P with the location of the second centroid Q.

In an exemplary embodiment of the step S253, the processing device 200 rotates the chamfer template about the first centroid P by comparing the location of the first modified object with the location of the second modified object.

Additionally, before performing the chamfer distance transform (steps S220 and S240), the processing device 200 can directly scale, shift, and/or rotate the preset image template according to the first centroid P, the second centroid Q, and the first and second maximum inscribed circles by lapping the real-time image over the preset image template. The scaling, shifting, and rotating of the preset image template can be referred to the scaling, shifting, and rotating of the chamfer template and thus, will not be repeated hereinafter.

In this embodiment, the steps S220, S240, S260, S262 and S264 can be referred to those in FIG. 6, and will not be repeated hereinafter. In this or some embodiments, after the real-time image or the preset image template is adjusted, the processing device 200 can directly lap the real-time image over the preset image template or lap the chamfer image over the chamfer template to compare them to obtain a recognition result.

Figure 11:
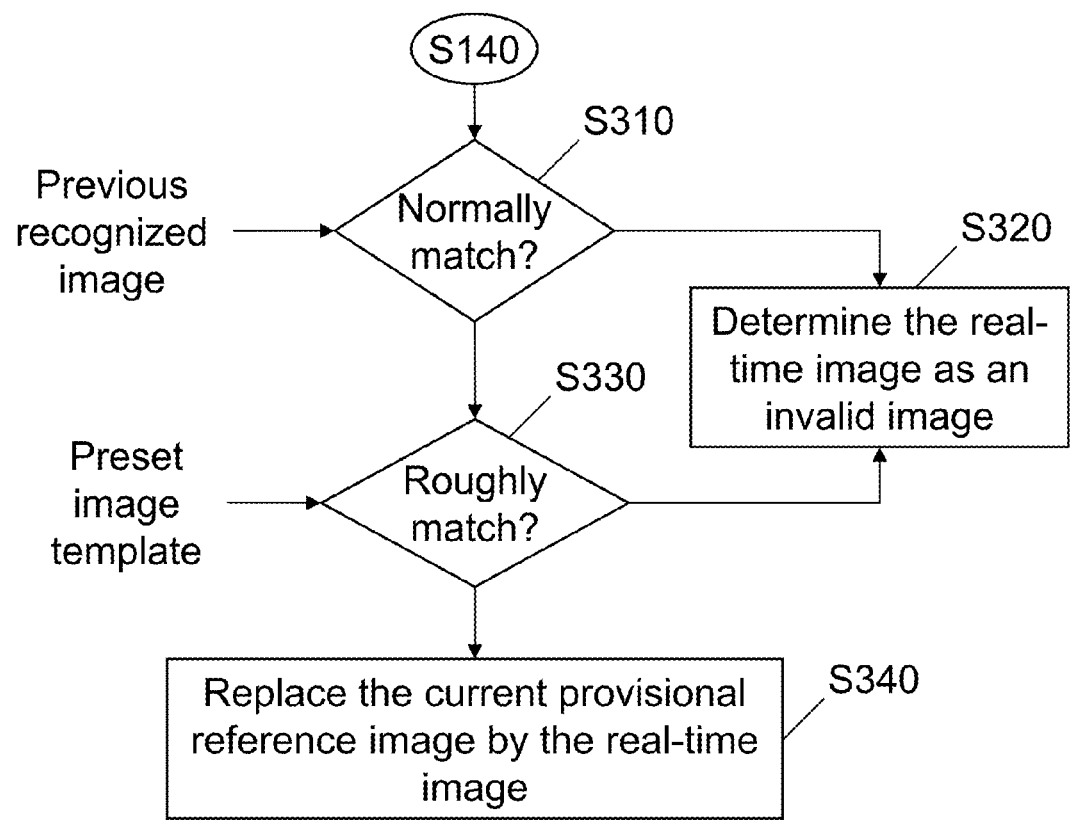
FIG. 11 is a flow chart of a dynamic object training method according to an embodiment of the disclosure.
Figure 12A:
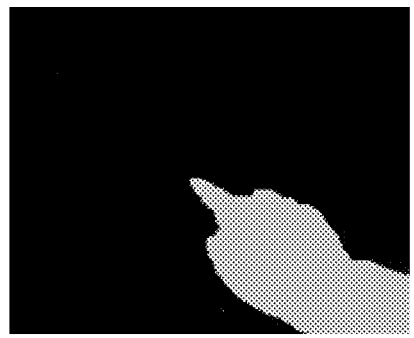
FIG. 12A is a schematic view of a real-time image according to an embodiment of the disclosure.
Figure 12B:
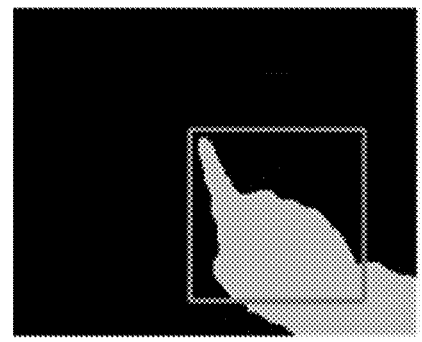
FIG. 12B is a schematic view of a previous recognized image according to an embodiment of the disclosure.

FIG. 11 is a flow chart of a dynamic template training method according to an embodiment of the disclosure. After or before the real-time image (as shown in FIG. 12A) is produced (step S140), the processing device 200 reads out a previous recognized image (or called provisional reference image) as shown in FIG. 12B from the provisional data storing unit 320 and checks whether the real-time image matches the previous recognized image (step S310). The processing device 200 may perform the chamfer distance transform on a third object of the previous recognized image to produce a chamfer reference image including a third modified object. The processing device 200 determines whether the difference between the first modified object and the third modified object is less than a second preset error threshold such as a PSNR value or a MSE value. The previous recognized image is, for example, a previous real-time image that is checked and matches its corresponding preset image template.

Figure 12C:
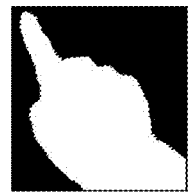
FIG. 12C is a schematic view of a preset image template according to an embodiment of the disclosure.
Figure 12D:
FIG. 12D is a schematic view of a new provisional reference image according to an embodiment of the disclosure.

When the real-time image does not match the previous recognized image, the real-time image is determined as an invalid image (step S320). When the real-time image matches the previous recognized image, the processing device 200 can further check whether the real-time image matches the preset image template (as shown in FIG. 12C) (step S330). When the real-time image does not match the preset image template, this real-time image is determined as an invalid image (step S320); otherwise, this real-time image is determined as a valid image and a new provisional reference image (as shown in FIG. 12D) for a next recognition task (step S340). This new provisional reference image is stored in the provisional data storing unit 320 to replace the current provisional reference image.

In this embodiment, to check whether the real-time image matches the preset image template can be referred to the description in the above one or more embodiments of the object recognition method and will not be repeated hereinafter.

Through the dynamic object training procedure, the data stored in the provisional data storing unit 320 may be updated. Accordingly, the owner of the object recognition apparatus 10 may establish his exclusive object reference and then the data stored in the provisional data storing unit 320 may directly be employed to perform the object recognition procedure to obtain a recognition result. This may reduce the quantity of image data to be processed and speed up the object recognition.

As set forth above, when the disclosure is applied to an electric device to recognize the shape of the user's hand and even the trace of the user's hand moving, the electric device will operate according to the control command generated according to the recognition result. In the following one or more embodiments, a smart glasses is taken as an example of the electric device for the illustrate purpose.

Please refer to FIG. 1. The smart glasses includes, for example, the object recognition apparatus 10 in FIG. 1 The processing device 200 recognizes the shape of the user's hand and detects the movement of the user's hand through a sequence of original frames outputted by the image capturing device 100. The image capturing device 100 has a field of view (FOV) including a preset sensing region, and the preset sensing region is smaller than or equal to the FOV. The image capturing device 100 is, for example, a color camera or a depth camera.

When the real-time images generated from the sequence of original frames match the preset image template, a control command corresponding to the preset image template is selected. When the first object of these real-time images moves out of the preset sensing region, the processing device 200 will consider that the movement of the first object matches a preset trace model. Therefore, the processing device 200 outputs a control command corresponding to the preset image template to control the image capturing device 100 to perform image capturing. In other embodiments, the preset trace model is a circle or a curve that the first object moves along.

Figure 13:
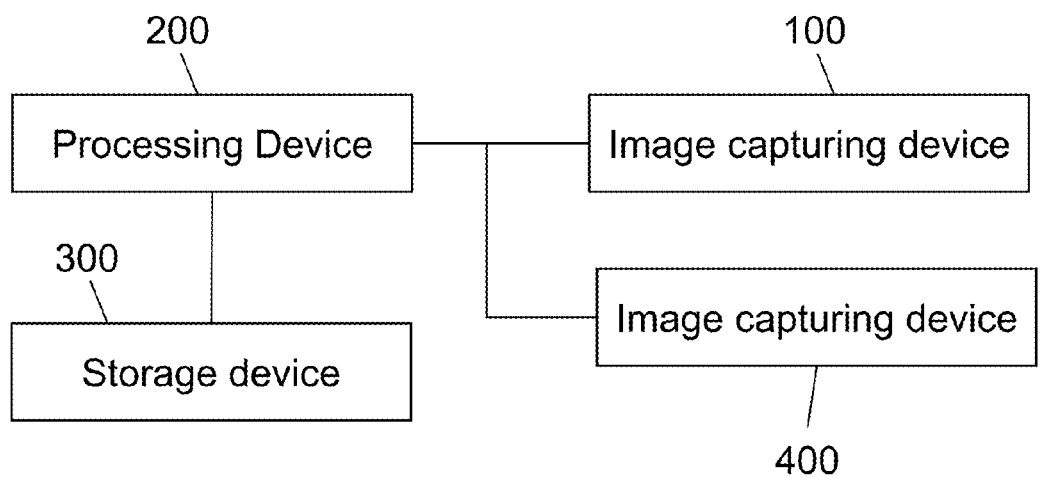
FIG. 13 is a block diagram of an object recognition apparatus according to another embodiment in the disclosure.

Please refer to FIG. 13. The smart glasses includes, for example, an object recognition apparatus in FIG. 13. FIG. 13 is a block diagram of an object recognition apparatus according to another embodiment in the disclosure. The object recognition apparatus in FIG. 13 is similar to the object recognition apparatus 10 in FIG. 1 but may further include an image capturing device 400. The image capturing device 400 is electrically connected to the processing device 200. For example, the image capturing device 100 is an IR camera, a color camera, or a depth camera, and the image capturing device 400 is a color camera or a depth camera.

Figure 14A:
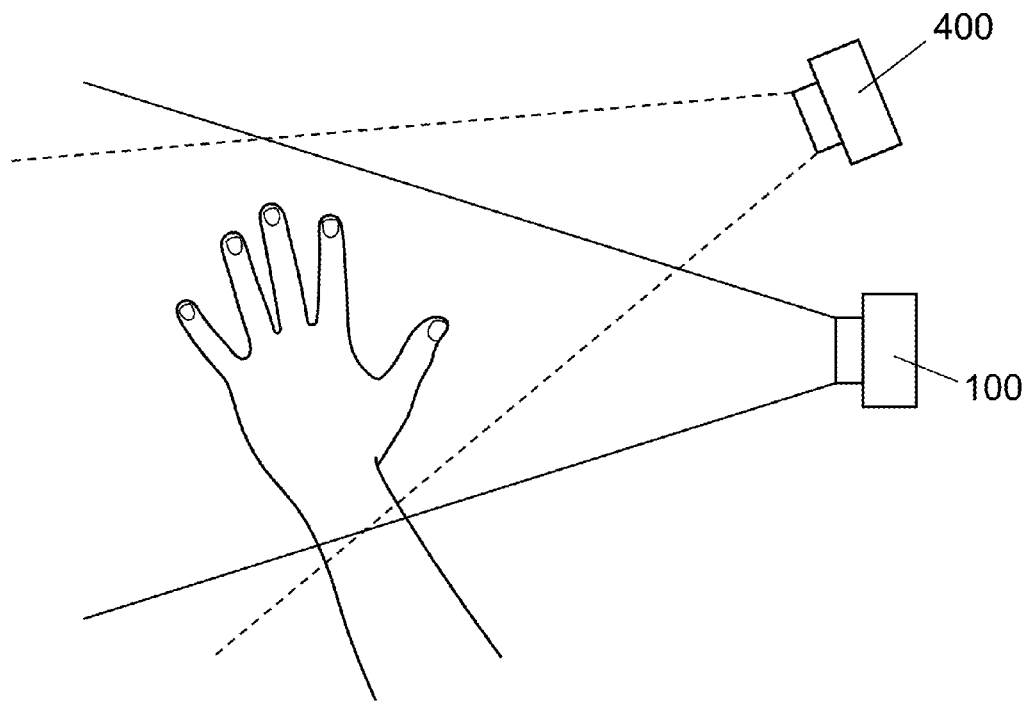
FIG. 14A is a schematic view of two image capturing devices simultaneously capturing an object according to an embodiment of the disclosure.
Figure 14B:
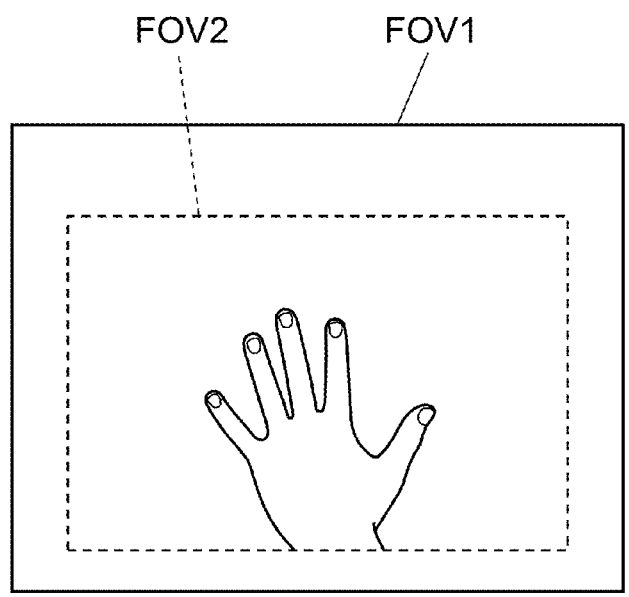
FIG. 14B is a schematic view of the fields of view of the two image capturing devices in FIG. 14A.

The image capturing device 400 cooperates with the image capturing device 100 to capture images similar to those captured by the image capturing device 100 since the image capturing devices 100 and 400 may be disposed closely (as shown in FIG. 14A). A FOV 1 of the image capturing device 100 is, for example, larger than a FOV 2 of the image capturing device 400 (as shown in FIG. 14B) such that the FOV 1 of the image capturing device 100 can overlap the FOV 2 of the image capturing device 400 and may exceed the FOV 2. The image capturing device 400 may be driven according to a control command to capture images that a user wants.

For example, a recognition condition (hand object) to generate the control command is that the shape of the user's hand is shown in FIG. 14A and that the user's hand leaves the field of view 2 of the image capturing device 400. When sensing that a first object exists in original frames outputted by the image capturing device 100, the processing device 200 performs the aforementioned object recognition method to recognize the shape of the user's hand and even the movement of the user's hand. Once the recognition result indicates that the shape of the user's hand and even the movement of the user's hand match such a recognition condition, the processing device 200 will send a corresponding control command to control the image capturing device 400 to capture one or more images that the user needs.

In other embodiments, different recognition conditions can be set according to different application needs.

In one embodiment, the same shape and different moving directions of the user's hand may indicate that the image capturing device 400 starts recording a video or taking a picture. For example, when the five fingers of the user's hand shut and the user's hand leaves the field of view 2 of the image capturing device 400 from left to right, the control command corresponding to the recognition condition may indicate that the image capturing device 400 starts recording a video. For example, when the five fingers of the user's hand shut and the user's hand leaves the field of view 2 of the image capturing device 400 from up to down, the control command corresponding to the recognition condition may indicate that the image capturing device 400 starts taking a picture.

In another embodiment, different shapes and any moving direction of the user's hand may indicate that the image capturing device 400 starts recording a video or taking a picture. For instance, when the five fingers of the user's hand shut and the user's hand leaves the field of view 2 of the image capturing device 400 from up to down, the control command may indicate that the image capturing device 400 starts taking a picture. For instance, when the five fingers of the user's hand open and the user's hand leaves the field of view 2 of the image capturing device 400 from up to down, the control command may indicate that the image capturing device 400 starts recording a video.

Accordingly, the disclosure employs the chamfer DT to transform the real-time image and the image template and compares the transformed image to be recognized with the transformed image template, thereby reducing the quantity of data to be processed and speeding up the image recognition. The disclosure may support the dynamic template training such that the degree of recognition may become more stable and a user may be able to establish personal object references. If the disclosure is applied to a smart glasses with a camera, the image capturing or the video recording may be protected from showing the user's hand in images that the user wants, through the design of the FOV of the camera and the design of the recognition condition.

What is claimed is:

1. An object recognition method, applied to an object recognition apparatus and comprising:
    acquiring a real-time image comprising a first object;
    performing a chamfer distance transform on the first object of the real-time image to produce a chamfer image comprising a first modified object;
    acquiring a plurality of preset image templates comprising a second object;
    performing the chamfer distance transform on the second object of each of the plurality of preset image templates to produce a chamfer template comprising a second modified object;
    determining whether difference between the first modified object and one of the second modified objects is less than a first preset error threshold;
    when the difference between the first modified object and the second modified object is less than the first preset error threshold, looking up a control command according to the preset image template corresponding to the second modified object, the object recognition apparatus operating according to the control command;
    comparing a size or location of the first object with sizes or locations of the second objects to determine whether to adjust the preset image templates, comprising:
        detecting a first centroid of the first object;
        detecting a first maximum inscribed circle according to the first centroid of the first object;
        detecting a second centroid of each of the second objects;
        detecting second maximum inscribed circles according to the second centroids of the second objects respectively;
        determining whether a size or location of the first maximum inscribed circle is equal to a size or location of one of the second maximum inscribed circles; and
        adjusting the preset image template comprising the second maximum inscribed circle when the size or location of the first maximum inscribed circle is different from the size or location of the second maximum inscribed circle; and
    when the size or location of the first object is different from the size or location of one of the second object, adjusting the preset image template comprising the second object.

2. The object recognition method according to claim 1, wherein the step of adjusting the preset image template comprises scaling, shifting, or rotating the second object of the preset image template.

3. The object recognition method according to claim 1, further comprising:
    comparing a size or location of the first modified object with sizes or locations of the second modified objects to determine whether to adjust the chamfer templates; and
    when the size or location of the first modified object is different from the size or location of one of the second modified objects, adjusting the chamfer template comprising the second modified object.

4. The object recognition method according to claim 3, wherein the step of comparing the size or location of the first modified object with the sizes or locations of the second modified objects to determine whether to adjust the chamfer templates comprises:
    detecting a third centroid of the first modified object;
    detecting a third maximum inscribed circle according to the third centroid of the first modified object;
    detecting a fourth centroid of each of the second modified objects;
    detecting fourth maximum inscribed circles according to the fourth centroids of the second modified objects respectively;
    determining whether a size or location of the third maximum inscribed circle is equal to a size or location of each of the fourth maximum inscribed circles; and
    adjusting the chamfer template comprising the fourth maximum inscribed circle when the size or location of the third maximum inscribed circle is different from the size or location of one of the fourth maximum inscribed circles.

5. The object recognition method according to claim 1, wherein the chamfer distance transform is performed on edges or skeletons of the first object and the second object.

6. The object recognition method according to claim 1, wherein when movement of the first object in a sequence of next real-time images matches a preset trace model, the control command is sent.

7. An object recognition apparatus, comprising:
    a first image capturing device, for recording a real-time image comprising a first object;
    a storage device, for storing preset image templates each of which comprises a second object; and
    a processing device connected to the first image capturing device and the storage device, for receiving the real-time image from the first image capturing device, receiving the preset image templates from the storage device, and performing the following steps:
        performing a chamfer distance transform on the first object of the real-time image to produce a chamfer image comprising a first modified object;

respectively performing the chamfer distance transform on the second objects of the preset image templates to produce chamfer templates each of which comprises a second modified object;

determining whether difference between the first modified object and one of the second modified objects is less than a first preset error threshold;

when the difference between the first modified object and the second modified object is less than the first preset error threshold, looking up a control command according to the preset image template corresponding to the second modified object, the object recognition apparatus operating according to the control command;

comparing a size or location of the first object with a size or location of each of the second objects to determine whether to adjust the preset image templates, and when the size or location of the first object is different from the size or location of one of the second objects, the processing device adjusting the preset image template comprising the second object; and detecting a first centroid of the first object, detecting a first maximum inscribed circle in the first object according to the first centroid, detecting a second centroid of each of the second objects, detecting a second maximum inscribed circle in each of the second objects according to each of the second centroids, and determining whether a size or location of the first maximum inscribed circle is equal to a size or location of each of the second maximum inscribed circles; and when the size or location of the first maximum inscribed circle is different from the size or location of one of the second maximum inscribed circles, the processing device adjusting the preset image template comprising the second maximum inscribed circle.

8. The object recognition apparatus according to claim 7, wherein when adjusting the preset image template, the processing device scales, shifts, or rotates the second object of the preset image template.

9. The object recognition apparatus according to claim 7, wherein the processing device further compares a size or location of the first modified object with sizes or locations of the second modified objects to determine whether to adjust the chamfer templates, and when the size or location of the first modified object is different from the size or location of one of the second modified objects, the processing device adjusts the chamfer template comprising the second modified object.

10. The object recognition apparatus according to claim 9, wherein the processing device detects a third centroid of the first modified object, detects a third maximum inscribed circle according to the third centroid of the first modified object, detects a fourth centroid of each of the second modified objects, detects fourth maximum inscribed circles according to the fourth centroids of the second modified objects respectively, and determines whether a size or location of the third maximum inscribed circle is equal to a size or location of each of the fourth maximum inscribed circles; and when the size or location of the third maximum inscribed circle is different from the size or location of one of the fourth maximum inscribed circles, the processing device adjusts the chamfer template comprising the fourth maximum inscribed circle.

11. The object recognition apparatus according to claim 7, wherein the chamfer distance transform is performed on edges or skeletons of the first object and the second objects.

12. The object recognition apparatus according to claim 7, wherein when movement of the first object in a sequence of next real-time images matches a preset trace model, the processing device sends the control command.

13. The object recognition apparatus according to claim 12, wherein the first image capturing device has a field of view (FOV) comprising a preset sensing region, the preset sensing region is smaller than or equal to the FOV, and when the first object of the sequence of next real-time images moves out of the preset sensing region, the control command is sent to control the first image capturing device to perform image capturing.

14. The object recognition apparatus according to claim 12, wherein the first image capturing device has a first FOV, the object recognition apparatus further comprises a second image capturing device having a second FOV, the first FOV is larger than or equal to the second FOV, and when the first object of the sequence of next real-time images from the second FOV to the first FOV, the control command is sent to control the second image capturing device to perform image capturing.

15. An object recognition method, applied to an object recognition apparatus and comprising:

acquiring an original frame from a first image capturing device;

performing an image pre-processing procedure on the original frame to produce a real-time image comprising a first object;

performing a chamfer distance transform on the first object of the real-time image to generate a chamfer image comprising a first modified object;

acquiring a plurality of preset image templates comprising a second object;

performing the chamfer distance transform on the second object of each of the plurality of preset image templates to generate a chamfer template comprising a second modified object;

determining whether difference between the first modified object and one of the second modified objects is less than a first preset error threshold;

when the difference between the first modified object and one of the second modified objects is less than the first preset error threshold, looking up a control command according to the preset image template corresponding to the second modified object, the object recognition apparatus operating according to the control command;

comparing a size or location of the first object with sizes or locations of the second objects to determine whether to adjust the preset image templates, comprising:

detecting a first centroid of the first object;

detecting a first maximum inscribed circle in the first object according to the first centroid;

detecting a second centroid of each of the second objects;

detecting second maximum inscribed circles in the second objects according to the second centroids respectively;

determining whether a size or location of the first maximum inscribed circle is equal to a size or location of each of the second maximum inscribed circles; and adjusting the preset image template comprising the second maximum inscribed circle when the size or location of the first maximum inscribed circle is different from the size or location of one of the second maximum inscribed circles; and when the size or location of the first object is different from the size or location of one of the second object, adjusting the preset image template comprising the second object.

16. The object recognition method according to claim 15, further comprising:
comparing a size or location of the first modified object with sizes or locations of the second modified objects to determine whether to adjust the chamfer templates; and
when the size or location of the first modified object is different from the size or location of one of the second modified objects, adjusting the chamfer template comprising the second modified object.

17. The object recognition method according to claim 16, further comprising:
detecting a third centroid of the first modified object;
detecting a third maximum inscribed circle in the first modified object according to the third centroid;
detecting a fourth centroid of the second modified object;
detecting a fourth maximum inscribed circle in each of the second modified objects according to each of the fourth centroids;
determining whether a size or location of the third maximum inscribed circle is equal to a size or location of each of the fourth maximum inscribed circles; and
adjusting the chamfer template comprising the fourth maximum inscribed circle when the size or location of the third maximum inscribed circle is different from the size or location of one of the fourth maximum inscribed circles.

18. The object recognition method according to claim 15, wherein the chamfer distance transform is performed on edges or skeletons of the first object and the second objects.

19. The object recognition method according to claim 15, further comprising:
acquiring a provisional reference image comprising a third object;
performing the chamfer distance transform on the third object of the provisional reference image to produce a chamfer reference image comprising a third modified object;
determining whether difference between the first modified object and the third modified object is less than a second error threshold;
when the difference between the first modified object and the third modified object is less than the second error threshold, performing the step of determining whether the difference between the first modified object and one of the second modified objects is less than the first error threshold; and
replacing the provisional reference image by the real-time image when the difference between the first modified object and the second modified object is less than the first error threshold.

20. The object recognition method according to claim 19, wherein the chamfer distance transform is performed on an edge or a skeleton of the third object of the provisional reference image.

21. The object recognition method according to claim 15, wherein when movement of the first object in a sequence of next real-time images matches a preset trace model, the control command is sent, and the sequence of next real-time images is generated from a sequence of next original frames.

22. The object recognition method according to claim 21, wherein the first image capturing device has a field of view (FOV) comprising a preset sensing region, the preset sensing region is smaller than or equal to the FOV, and when the first object of the sequence of next real-time images moves out of the preset sensing region, the control command is sent to control the first image capturing device to perform image capturing.

23. The object recognition method according to claim 21, wherein the object recognition apparatus further comprises a second image capturing device, the first image capturing device has a first FOV to capture the real-time images, the second image capturing device has a second FOV, the first FOV is larger than or equal to the second FOV, and when the first object of the sequence of next original frames moves from the second FOV to the first FOV, the control command is sent to control the second image capturing device to perform image capturing.

24. The object recognition method according to claim 15, wherein the first object is a user's hand.

25. An object recognition method, applied to an object recognition apparatus and comprising:
acquiring a real-time image, which comprises a first object, from a first image capturing device;
acquiring preset image templates each of which comprises a second object;
performing a chamfer distance transform on the first object of the real-time image to produce a chamfer image comprising a first modified object;
performing the chamfer distance transform on the second object of each of the preset image templates to produce a chamfer template comprising a second modified object;
determining whether difference between the first modified object and each of the second modified objects is less than a preset error threshold;
when the difference between the first modified object and one of the second modified objects is less than the preset error threshold, looking up a control command according to the preset image template corresponding to the second modified object;
when movement of the first object in a sequence of next real-time images acquired from the first image capturing device matches a preset trace model, sending the control command to control the object recognition apparatus;
comparing a size or location of the first object with sizes or locations of the second objects to determine whether to adjust the preset image templates, comprising:
detecting a first centroid of the first object;
detecting a first maximum inscribed circle according to the first centroid of the first object;
detecting a second centroid of each of the second objects;
detecting second maximum inscribed circles according to the second centroids of the second objects respectively;
determining whether a size or location of the first maximum inscribed circle is equal to a size or location of one of the second maximum inscribed circles; and
adjusting the preset image template comprising the second maximum inscribed circle when the size or location of the first maximum inscribed circle is different from the size or location of the second maximum inscribed circle; and
when the size or location of the first object is different from the size or location of one of the second object, adjusting the preset image template comprising the second object.

26. The object recognition method according to claim 25, wherein the first image capturing device has a FOV comprising a preset sensing region, the preset sensing region is smaller than or equal to the FOV, and when the first object of the sequence of next real-time images moves out of the preset sensing region, the control command is sent to control the first image capturing device to perform image capturing.

27. The object recognition method according to claim 25, wherein the object recognition apparatus further comprises a second image capturing device, the first image capturing device has a first FOV to provide the real-time images, the second image capturing device has a second FOV, the first FOV is larger than or equal to the second FOV, and when the first object of the sequence of next real-time images moves from the second FOV to the first FOV, the control command is sent to control the second image capturing device to perform image capturing.

28. The object recognition method according to claim 25, wherein the first object is a user's hand.

29. The object recognition method according to claim 25, wherein the object recognition apparatus is a smart glasses.

30. An object recognition apparatus, comprising:
  a first image capturing device, for recording a real-time image comprising a first object;
  a storage device, for storing preset image templates each of which comprises a second object; and
  a processing device connected to the first image capturing device and the storage device, for receiving the real-time image from the first image capturing device, receiving the preset image templates from the storage device, and performing the following steps:
    performing a chamfer distance transform on the first object of the real-time image to produce a chamfer image comprising a first modified object;
    respectively performing the chamfer distance transform on the second objects of the preset image templates to produce chamfer templates each of which comprises a second modified object;
    determining whether difference between the first modified object and one of the second modified objects is less than a first preset error threshold;
    when the difference between the first modified object and the second modified object is less than the first preset error threshold, looking up a control command according to the preset image template corresponding to the second modified object, the object recognition apparatus operating according to the control command;
    comparing a size or location of the first modified object with sizes or locations of the second modified objects to determine whether to adjust the chamfer templates, and when the size or location of the first modified object is different from the size or location of one of the second modified objects, the processing device adjusting the chamfer template comprising the second modified object; and
    detecting a third centroid of the first modified object, detecting a third maximum inscribed circle according to the third centroid of the first modified object, detecting a fourth centroid of each of the second modified objects, detects fourth maximum inscribed circles according to the fourth centroids of the second modified objects respectively, and determining whether a size or location of the third maximum inscribed circle is equal to a size or location of each of the fourth maximum inscribed circles; and when the size or location of the third maximum inscribed circle is different from the size or location of one of the fourth maximum inscribed circles, the processing device adjusting the chamfer template comprising the fourth maximum inscribed circle.

* * * * *